US011233586B2

(12) United States Patent
Kalhan

(10) Patent No.: US 11,233,586 B2
(45) Date of Patent: Jan. 25, 2022

(54) PROVIDING USER EQUIPMENT FEEDBACK VIA SIGNAL FORWARDING DEVICE

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 201 days.

(21) Appl. No.: 16/079,699

(22) PCT Filed: Mar. 2, 2017

(86) PCT No.: PCT/US2017/020352
§ 371 (c)(1),
(2) Date: Aug. 24, 2018

(87) PCT Pub. No.: WO2017/160506
PCT Pub. Date: Sep. 21, 2017

(65) Prior Publication Data
US 2019/0052375 A1  Feb. 14, 2019

Related U.S. Application Data

(60) Provisional application No. 62/310,498, filed on Mar. 18, 2016.

(51) Int. Cl.
| | |
|---|---|
| H04B 17/24 | (2015.01) |
| H04B 7/155 | (2006.01) |
| H04B 17/309 | (2015.01) |
| H04L 5/00 | (2006.01) |
| H04W 24/10 | (2009.01) |
| H04W 72/04 | (2009.01) |

(52) U.S. Cl.
CPC ............. *H04B 17/24* (2015.01); *H04B 7/155* (2013.01); *H04B 17/309* (2015.01); *H04L 5/0055* (2013.01); *H04L 5/0057* (2013.01); *H04W 24/10* (2013.01); *H04W 72/042* (2013.01)

(58) Field of Classification Search
CPC ...... H04B 17/24; H04B 17/309; H04B 7/155; H04L 5/0055; H04L 5/0057; H04W 24/10
See application file for complete search history.

(56) References Cited

U.S. PATENT DOCUMENTS

| | | | |
|---|---|---|---|
| 9,059,890 B2 | 6/2015 | Youn et al. | |
| 2007/0081483 A1* | 4/2007 | Jang | H04B 7/2615 370/315 |

(Continued)

FOREIGN PATENT DOCUMENTS

WO  WO 2015-199490 A1  12/2015

*Primary Examiner* — Jael M Ulysse

(57) ABSTRACT

A downlink signal is received at an origination device (e.g., a user equipment (UE) device). In response to receiving the downlink signal, the origination device transmits an uplink signal to a signal forwarding device. The uplink signal received, at the signal forwarding device, from the origination device is a "received signal," which contains a destination identifier. The signal forwarding device transmits a "forwarded signal" to a destination associated with the destination identifier. The "forwarded signal" is based on the contents of the "received signal" and/or any information that may be ascertained from the "received signal." The received signal may also contain a downlink channel feedback report and/or an acknowledgment response. Based on the forwarded signal, a signal forwarding scheme may be selected.

24 Claims, 2 Drawing Sheets

(56) References Cited

U.S. PATENT DOCUMENTS

| | | | |
|---|---|---|---|
| 2008/0009241 A1* | 1/2008 | Do | H04W 40/22 455/9 |
| 2008/0025280 A1* | 1/2008 | Hsu | H04W 40/22 370/341 |
| 2008/0025323 A1* | 1/2008 | Khan | H04W 28/06 370/400 |
| 2008/0075094 A1* | 3/2008 | Ahn | H04B 7/155 370/400 |
| 2008/0248744 A1* | 10/2008 | Beck | H04B 7/155 455/7 |
| 2009/0060010 A1 | 3/2009 | Maheshwari et al. | |
| 2009/0073915 A1* | 3/2009 | Zhang | H04B 7/2606 370/315 |
| 2009/0290528 A1* | 11/2009 | Kwon | H04L 47/10 370/315 |
| 2010/0022184 A1* | 1/2010 | Khoshnevis | H04L 1/1607 455/7 |
| 2010/0035541 A1* | 2/2010 | Kim | H04B 7/15557 455/9 |
| 2010/0077274 A1* | 3/2010 | Kim | H04L 1/1893 714/750 |
| 2010/0232345 A1* | 9/2010 | Tsai | H04B 7/15528 370/315 |
| 2010/0248751 A1* | 9/2010 | Tsutsui | H04B 7/15535 455/458 |
| 2010/0315956 A1* | 12/2010 | Nakao | H04W 72/1268 370/245 |
| 2011/0158155 A1* | 6/2011 | Park | H04W 76/12 370/315 |
| 2011/0176585 A1* | 7/2011 | Seo | H04B 7/1555 375/211 |
| 2011/0199919 A1* | 8/2011 | Lin | H04B 7/2606 370/252 |
| 2011/0212685 A1* | 9/2011 | Nakagawa | H04B 7/15557 455/9 |
| 2012/0071085 A1* | 3/2012 | Gunnarsson | H04W 24/00 455/7 |
| 2012/0140796 A1* | 6/2012 | Dai | H04L 1/0077 375/213 |
| 2012/0159279 A1* | 6/2012 | Braithwaite | H04W 84/047 714/751 |
| 2012/0182930 A1* | 7/2012 | Sawai | H04B 7/155 370/315 |
| 2012/0213148 A1* | 8/2012 | Saito | H04L 5/0023 370/315 |
| 2013/0084795 A1* | 4/2013 | Van Phan | H04W 84/047 455/15 |
| 2013/0135988 A1* | 5/2013 | Kim | H04L 1/1887 370/216 |
| 2014/0086141 A1* | 3/2014 | Morioka | H04W 52/02 370/315 |
| 2015/0043423 A1* | 2/2015 | Hadef | H04L 5/0044 370/315 |
| 2015/0117300 A1 | 4/2015 | Nam et al. | |
| 2015/0173059 A1* | 6/2015 | Park | H04B 7/155 370/329 |
| 2015/0327235 A1* | 11/2015 | Morioka | H04W 24/08 370/329 |
| 2017/0230871 A1* | 8/2017 | Rangaswamy | H04W 36/0033 |
| 2018/0035354 A1* | 2/2018 | Martin | H04W 8/005 |

* cited by examiner

PROVIDING USER EQUIPMENT FEEDBACK VIA SIGNAL FORWARDING DEVICE

CLAIM OF PRIORITY

The present application claims priority to Provisional Application No. 62/310,498, entitled "RELAY FORWARDING UE'S FEEDBACK," filed Mar. 18, 2016, assigned to the assignee hereof and hereby expressly incorporated by reference in its entirety.

FIELD

This invention generally relates to wireless communications and more particularly to providing feedback to a destination device via a signal forwarding device.

BACKGROUND

Some communication systems utilize a signal forwarding device, such as a repeater station, relay station or a self-backhauled station to facilitate the transfer of information between user equipment (UE) devices and a core network. The signal forwarding device is typically not connected directly to the core network but still provides service to the UE devices by forwarding information to and from the UE devices and a base station, which is connected to the core network. Where the signal forwarding device is a repeater, the repeater simply retransmits downlink signals received from another base station to the UE device and retransmits uplink signals received from the UE device to the other base station. Although the repeater may apply limited signal processing to the incoming signal such as filtering, frequency shifting, and amplification, a repeater will not decode the incoming signal that is to be forwarded. Relay stations and self-backhaul stations perform at least some signal processing before retransmitting the information. Such processing can vary from partial decoding to complete decoding of the incoming signal. For example, the incoming signal can be completely decoded and used to generate a new signal or the incoming signal may not be completely decoded but still used to transmit the forwarded outgoing signal. Some of the various levels of processing (forwarding techniques) are sometimes referred to as amplify and forward (AF), partial decoding and forward (PDF), and decode and forward (DF) schemes.

SUMMARY

A downlink signal is received at an origination device (e.g., a user equipment (UE) device). In response to receiving the downlink signal, the origination device transmits an uplink signal to a signal forwarding device. The uplink signal received, at the signal forwarding device, from the origination device is a "received signal," which contains a destination identifier. The signal forwarding device transmits a "forwarded signal" to a destination associated with the destination identifier. The "forwarded signal" is based on the contents of the "received signal" and/or any information that may be ascertained from the "received signal." The received signal may also contain a downlink channel feedback report and/or an acknowledgment response. Based on the forwarded signal, a signal forwarding scheme may be selected.

DETAILED DESCRIPTION

As discussed above, communication systems often employ repeaters, relays and self-backhauled base stations to forward signals transmitted between base stations and the UE devices served by the base stations. Signals may be forwarded from the base station to the UE device, from the UE device to the base station, or both. In some systems, scheduling of communication resources for the communication channel between the signal forwarding device (e.g., repeater, relay, etc.) and the UE device is performed by a scheduler at the base station or a central scheduler connected to the base station. In the examples discussed herein, it is assumed that the scheduler is located at, or connected to, a base station to/from which the signal forwarding device forwards signals. However, the scheduler may not be physically located at the base station and may be located at any other suitable location (e.g., at the signal forwarding device or elsewhere in the radio access network to which the base station belongs).

For the examples discussed herein, various methods, devices, and systems will be described that utilize a signal forwarding device to provide downlink feedback from an origination device to a destination device. Since the signal forwarding device is central to the examples, the nomenclature used throughout the description centers on the signal forwarding device. More specifically, an "origination device" is a device from which a signal is transmitted to the signal forwarding device, and the signal being received at the signal forwarding device from an origination device is referred to as a "received signal." Similarly, a "destination device" is a device to which the signal forwarding device transmits a signal, which is referred to herein as a "forwarded signal." Moreover, although most of the following examples refer to a UE device as the "origination device" and to a base station as the "destination device," the examples may be modified so that the base station is the "origination device," and the UE device is the "destination device."

Figure 1:
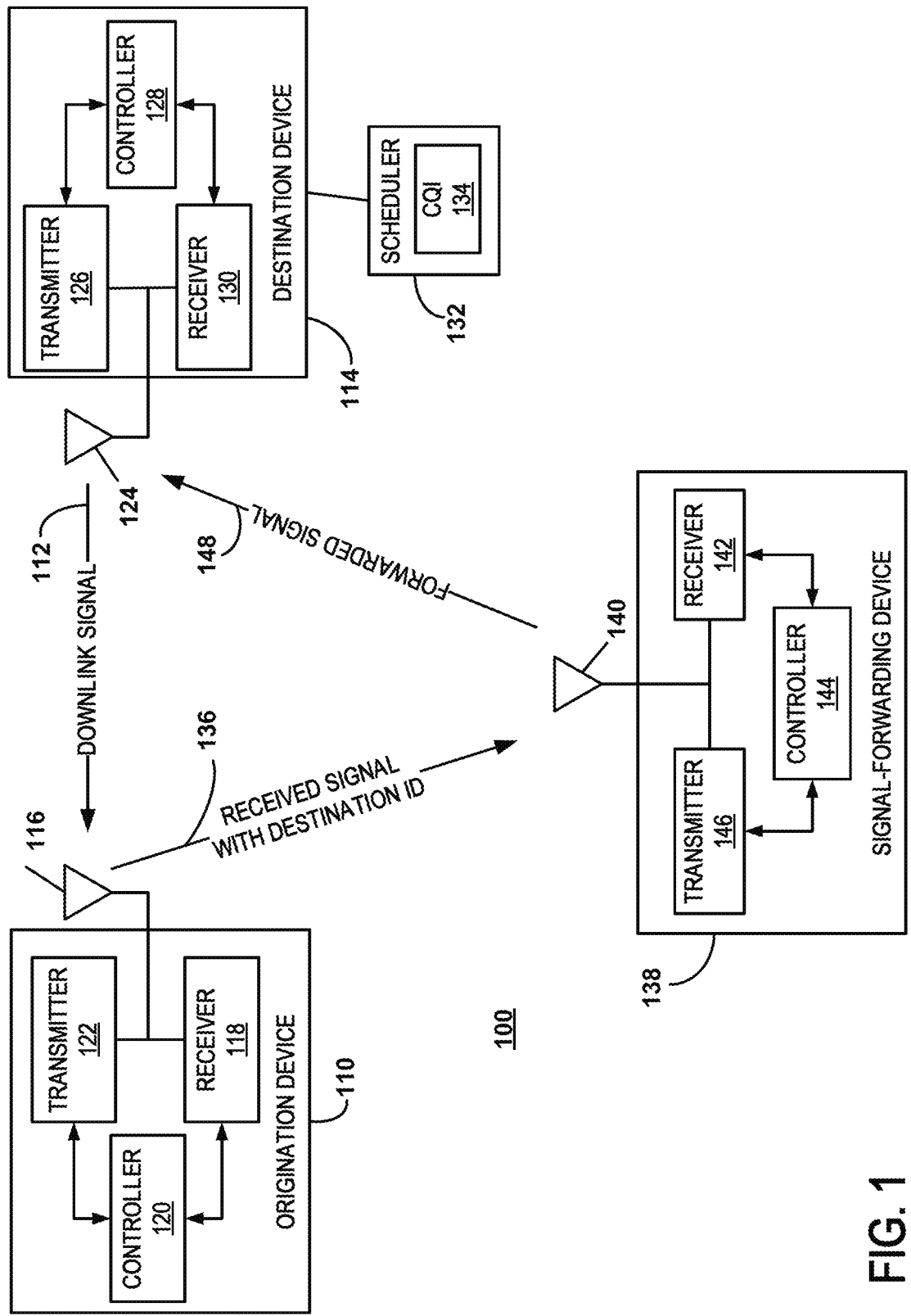
FIG. 1 is a block diagram of an example of a wireless communication system including an origination device, a signal forwarding device, and a destination device.

FIG. 1 is a block diagram of an example of a wireless communication system 100 including an origination device, a signal forwarding device, and a destination device. The origination device 110 and destination device 114 may be any kind of wireless communication devices and may be stationary or portable. For the examples discussed herein, the destination device 114 is a base station, and the origination device 110 is a user equipment (UE) device such as a handset. However, the devices 110, 114 may be different types of devices in other circumstances. For example, both devices may be UE devices. In some situations, the origination device, the signal forwarding device, and the destination device are all UE devices.

In the example of FIG. 1, destination device 114 provides downlink wireless communication service to origination device 110. Thus, origination device 110 receives downlink signal 112 from destination device 114. The downlink signal 112 is received via antenna 116 and receiver 118 of origination device 110. Origination device 110 further comprises a controller 120 and a transmitter 122.

Destination device 114 transmits the downlink signal 112 to origination device 110 via antenna 124 and transmitter 126. Destination device 114 further comprises a controller 128 and a receiver 130.

Scheduler 132 is located at destination device 114 in the example shown in FIG. 1. However, the system 100 could be modified so that the scheduler 132 is located at any other suitable location. The scheduler may be an application running on equipment connected directly to destination device 114 or connected through a backhaul or other communication link. Regardless of the location of scheduler 132, channel quality information (CQI) 134 regarding the various communication links within the system 100 is provided to scheduler 132, which uses the CQI 134 to schedule communication resources to be used by the various entities within the system 100. For the example shown in FIG. 1, the scheduler 132 utilizes CQI pertaining to the communication link between the destination device 114 and the origination device 110, CQI pertaining to the communication link between the destination device 114 and the signal forwarding device 138, and CQI pertaining to the communication link between the origination device 110 and the signal forwarding device 138. Based on the channel quality for at least one of these three communication links, the scheduler 132 schedules communication resources.

In the example shown in FIG. 1, the distance between destination device 114 and origination device 110 is such that the transmit power setting of the destination device 114 is sufficient to transmit downlink signals to the origination device 110, but the transmit power setting of the origination device 110 is not sufficient to transmit uplink signals to the destination device 114. Thus, in response to receiving the downlink signal 112, the origination device 110 transmits a received signal 136 to signal forwarding device 138. The received signal 136 of the example shown in FIG. 1 comprises a destination identifier and is transmitted in an uplink control channel or an uplink data channel.

The signal forwarding device 138 is configured to transmit a forwarded signal 148, which is based on the received signal 136, to the destination device 114. In this manner, the signal forwarding device 138 forwards the uplink signals from the origination device 110 to the destination device 114. For the examples discussed herein, the forwarded signal 148 is transmitted within a single frequency band. The incoming received signal 136 is transmitted within an origination device-to-signal forwarding device channel (OD-SFD channel), which includes a single frequency band. However, any combination of frequency bands and frequency sub-bands may be used for the OD-SFD channel.

The received signal 136 can additionally include a downlink channel feedback report comprising downlink channel measurements related to one or more downlink signals received by the origination device 110. For example, the downlink channel feedback report may contain downlink channel measurements for downlink signal 112 received from the destination device 114 and/or downlink channel measurements for one or more downlink signals received from one or more base stations other than destination device 114. The downlink channel feedback report can additionally include the location of the resources (e.g., time slots, sub-carriers, reference signal, etc.) on which the downlink channel measurements were made.

The downlink channel feedback report may also identify a carrier on which the downlink channel measurements were made, a cell identifier associated with destination device 114 that transmitted the downlink signal 112, and/or a spatial vector associated with a beamformed downlink signal. In some examples, the downlink channel feedback report may identify a cell identifier associated with a base station, other than destination device 114, that transmitted the downlink signal. This scenario might occur when the downlink signal is received from a base station other than destination device 114, but the origination device 110 needs to submit the downlink channel feedback report to the scheduler 132 located at the destination device 114.

In yet another scenario, origination device 110 can receive downlink signals from a first device (e.g., destination device 114), as the primary carrier of the downlink signals, and can also receive downlink signals from a second device (e.g., signal forwarding device 138 or a base station other than destination device 114), as the secondary carrier of the downlink signals. In such a scenario, the downlink channel feedback report may (1) identify the primary carrier and/or the secondary carrier on which the downlink channel measurements were made, (2) include a cell identifier associated with the first device that transmitted the primary carrier and/or a cell identifier associated with the second device that transmitted the secondary carrier, and/or (3) include a spatial vector associated with each of one or more beamformed downlink signals, respectively.

The received signal 136 can also include an acknowledgment response, which can be either a positive acknowledgment response (ACK) or a negative acknowledgment response (NACK). The ACK message indicates that a downlink signal was successfully received by the origination device 110. The NACK message indicates that the downlink signal was not successfully received by the origination device 110. In some situations, the ACK/NACK message is a message that is forwarded on to the destination device 114 by the signal forwarding device 138. In other situations, it a message intended for the signal forwarding device 138. In still other situations, the ACK message can be an indication to both the signal forwarding device 138 and the destination device 114. In scenarios in which the received signal 136 includes an acknowledgment response, the received signal 136 may additionally identify a carrier on which the downlink signal 112 was received, a cell identifier associated with destination device 114 that transmitted the downlink signal 112, a cell identifier associated with a base station, other than destination device 114, that transmitted the downlink signal, and/or a spatial vector associated with a beamformed downlink signal.

As described above, origination device 110 can receive downlink signals from a first device (e.g., destination device 114), as the primary carrier of the downlink signals, and can also receive downlink signals from a second device (e.g., signal forwarding device 138 or a base station other than destination device 114), as the secondary carrier of the downlink signals. In such a scenario, the received signal 136 may (1) identify the primary carrier and/or the secondary carrier on which the downlink channel measurements were made, (2) include a cell identifier associated with the first device that transmitted the primary carrier and/or a cell identifier associated with the second device that transmitted the secondary carrier, and/or (3) include a spatial vector associated with each of one or more beamformed downlink signals, respectively.

The signal forwarding device 138 receives the received signal 136 via antenna 140 and receiver 142. The signal forwarding device 138 further comprises controller 144 and transmitter 146, as well as other electronics, hardware, and code. The signal forwarding device 138 is any fixed, mobile, or portable equipment that performs the functions described herein. The various functions and operations of the blocks described with reference to the signal forwarding device 138 may be implemented in any number of devices, circuits, or elements. Two or more of the functional blocks may be integrated in a single device, and the functions described as performed in any single device may be implemented over several devices.

The controller 144 includes any combination of hardware, software, and/or firmware for executing the functions described herein as well as facilitating the overall functionality of the signal forwarding device 138. An example of a suitable controller 144 includes code running on a microprocessor or processor arrangement connected to memory.

The transmitter 146 includes electronics configured to transmit wireless signals to destination device 114. In some situations, the transmitter 146 may include multiple transmitters. The receiver 142 includes electronics configured to receive wireless signals from origination device 110. In some situations, the receiver 142 may include multiple receivers. The receiver 142 and transmitter 146 receive and transmit signals, respectively, through an antenna 140. The antenna 140 may include separate transmit and receive antennas. In some circumstances, the antenna 140 may include multiple transmit and receive antennas.

The transmitter 146 and receiver 142 in the example of FIG. 1 perform radio frequency (RF) processing including modulation and demodulation. The receiver 142, therefore, may include components such as low noise amplifiers (LNAs) and filters. The transmitter 146 may include filters and amplifiers. Other components may include isolators, matching circuits, and other RF components. These components in combination or cooperation with other components perform the signal forwarding functions. The required components may depend on the particular signal forwarding scheme that is employed. For the example shown in FIG. 1, the signal forwarding scheme is a partial decode and forward (PDF) scheme that performs (1) demodulation of the incoming signal (e.g., received signal 136) without decoding, and (2) modulation and transmission of the "clean" symbols.

The transmitter 146 includes a modulator (not shown), and the receiver 142 includes a demodulator (not shown). The modulator modulates the signals to be transmitted as part of the forwarded signal 148 and can apply any one of a plurality of modulation orders. As is known, the modulation order determines the number of different symbols that are used to represent the transmitted data for digital modulation. There is a trade-off between modulation order, required energy, and bit-error rate (BER). As the modulation order is increased, the average energy per bit must also be increased to maintain the same BER. The demodulator demodulates the received signal 136 in accordance with one of a plurality of modulation orders. The modulation order for transmissions to the destination device 114, however, is established by scheduler 132.

For the example shown in FIG. 1, the signal forwarding device 138 may be a fixed device or apparatus that is installed at a particular location at the time of system deployment. Examples of such equipment include fixed base stations or fixed transceiver stations. In some situations, the signal forwarding device 138 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer.

In still other situations, the signal forwarding device 138 may be a portable device that is not fixed to any particular location. Accordingly, the signal forwarding device 138 may be a portable user device such as a UE device in some circumstances. In some implementations, the signal forwarding device 138 may be a base station, eNB, or access point that performs signal forwarding functions in addition to serving UE devices. For example, a self-backhauled eNB, connected to an anchor eNB, may be configured to perform signal forwarding functions for some UE devices in addition to directly serving other UE devices utilizing the wireless backhaul to the destination device 114 (e.g., anchor eNB).

The signal forwarding device 138 of FIG. 1 is configured to transmit a forwarded signal 148, via transmitter 146, to a destination associated with the destination identifier that was included in the received signal 136. In the example of FIG. 1, the destination associated with the destination identifier is destination device 114. The forwarded signal 148 is based on the received signal 136. Thus, the forwarded signal 148 may be an unmodified version of received signal 136.

Alternatively, forwarded signal 148 may be a reformatted or otherwise modified version of received signal 136. For example, received signal 136 may be reformatted or modified to facilitate transmission from signal forwarding device 138, reception by destination device 114, and/or processing of at least a portion of the contents of received signal 136. Moreover, the signal forwarding device 138 may apply one or more of the signal forwarding schemes, discussed in detail below, when forwarding an incoming signal. In the example shown in FIG. 1, the signal forwarding device 138 applies a single signal forwarding scheme to the received signal 136. Alternatively, the signal forwarding device 138 may dynamically apply one or more signal forwarding schemes to received signal 136 or to a portion thereof. For example, signal forwarding device 138 may apply different signal forwarding schemes for different portions (e.g., control channels and data channels) of the received signal 136. More specifically, the signal forwarding device 138 may decode the control channel of received signal 136 in order to obtain control information that needs to be forwarded to destination device 114. Conversely, the signal forwarding device 138 may simply forward the traffic data contained in the traffic channel of received signal 136 to the destination device 114, without decoding the traffic data.

In some examples, upon receiving the received signal 136, the signal forwarding device 138 measures the received signal 136 to obtain channel measurements associated with an origination device-to-signal forwarding device (OD-SFD) channel between the origination device 110 and the signal forwarding device 138. After measuring the received signal 136, the signal forwarding device 138 transmits the OD-SFD channel measurements to the destination associated with the destination identifier. The OD-SFD channel measurements are transmitted as part of the forwarded signal 148. Alternatively, the OD-SFD channel measurements can be transmitted separately from the forwarded signal 148.

Upon receiving the forwarded signal 148, via antenna 124, controller 128 of destination device 114 is configured to select, based at least partially upon the forwarded signal 148, a signal forwarding scheme. The signal forwarding scheme is selected from one or more of: an amplify and forward (AF) signal forwarding scheme, a decode and forward (DF) signal forwarding scheme, a partial decode and forward (PDF) signal forwarding scheme, a direct origination device-to-destination device signal forwarding scheme, and a control channel decode and forward/data channel forward without decoding scheme. The control channel decode and forward/data channel forward without decoding scheme involves (1) decoding the control channel of the received signal 136 and forwarding the decoded control information to the destination device 114, and (2) forwarding the traffic data contained in the traffic channel of the received signal 136 to the destination device 114, without decoding the traffic data.

The signal forwarding device 138 is capable of applying at least one type of partial decode and forwarding (PDF) signal forwarding scheme when forwarding an incoming signal. In some situations, the signal forwarding device 138 may be capable of applying more than one type of signal forwarding scheme. The signal forwarding device 138, for example, may be able to apply at least one of an amplify and forward (AF) scheme, decode and forward (DF) scheme, and a PDF scheme. As discussed herein, a signal forwarding scheme is based on the parameters, techniques, and/or level of processing applied to the incoming signal to generate the forwarded signal 148. Signal forwarding schemes can be categorized into three basic groups.

For example, repeater signal forwarding schemes generally include retransmission schemes where the incoming signal is received and retransmitted. At a minimum, the incoming signal (e.g., received signal 136) is amplified and retransmitted as the forwarded signal 148. In some repeater schemes, some processing is applied to the incoming signal. For example, the incoming signal may also be filtered and/or frequency shifted. Generally, however, the incoming signal is not demodulated or decoded in a repeater signal forwarding scheme. Repeater schemes are sometimes referred to as amplify and forward (AF) schemes.

Relay signal forwarding schemes include at least some decoding of the incoming signal to create the forwarded signal where the level of decoding can range from minimal to complete decoding of the incoming signal. Complete decoding includes fully decoding the incoming signal to extract the payload and then applying the decoded data to generate the new forwarded signal. Complete decoding schemes are sometimes referred to as decode and forward (DF) schemes. Several proposed techniques include partial decoding of the incoming signal to transmit a forwarded signal without complete decoding to extract the data from the signal. These schemes are sometimes referred to as partial decode and forward (PDF) schemes.

The AF signal forwarding scheme results in a relatively low-processing delay since baseband signal processing is not performed. In most cases, this scheme has relatively poor performance because of the increase in noise during the signal amplification. AF schemes, however, minimize latency because of the relatively low level of processing. A signal forwarded by a DF signal forwarding scheme, however, has much lower noise due to baseband processing performed to decode the signal, resulting in noise cancellation. The lower noise benefit comes with the cost of increased processing delay, resulting in a relatively high latency. Often, PDF signal forwarding schemes are considered to have an appropriate tradeoff between signal quality and latency relative to DF and AF schemes. For the examples herein, the incoming signal (e.g., received signal 136) is demodulated without decoding the demodulated signal, and the resulting symbols are modulated and transmitted as the forwarded signal 148. Since the incoming signal is not completely decoded, however, processing delays are reduced significantly compared to DF schemes.

The PDF scheme applied by the signal forwarding device 138 in the exemplary embodiments includes accumulating multiple received symbols to form a higher-order modulation symbol before retransmission. This is possible because a typical link between the signal forwarding device 138 and the destination device 114 has a relatively higher signal-to-noise ratio (SNR) compared to the link between the origination device 110 and the signal forwarding device 138. In some situations, for example, the signal forwarding device-to-destination device (SFD-DD) channel between the signal forwarding device 138 and the destination device 114 is generally static because both devices are fixed, whereas the origination device-to-signal forwarding device (OD-SFD) channel between the origination device 110 and the signal forwarding device 138 is typically dynamic because the origination device 110 is mobile.

Figure 2:
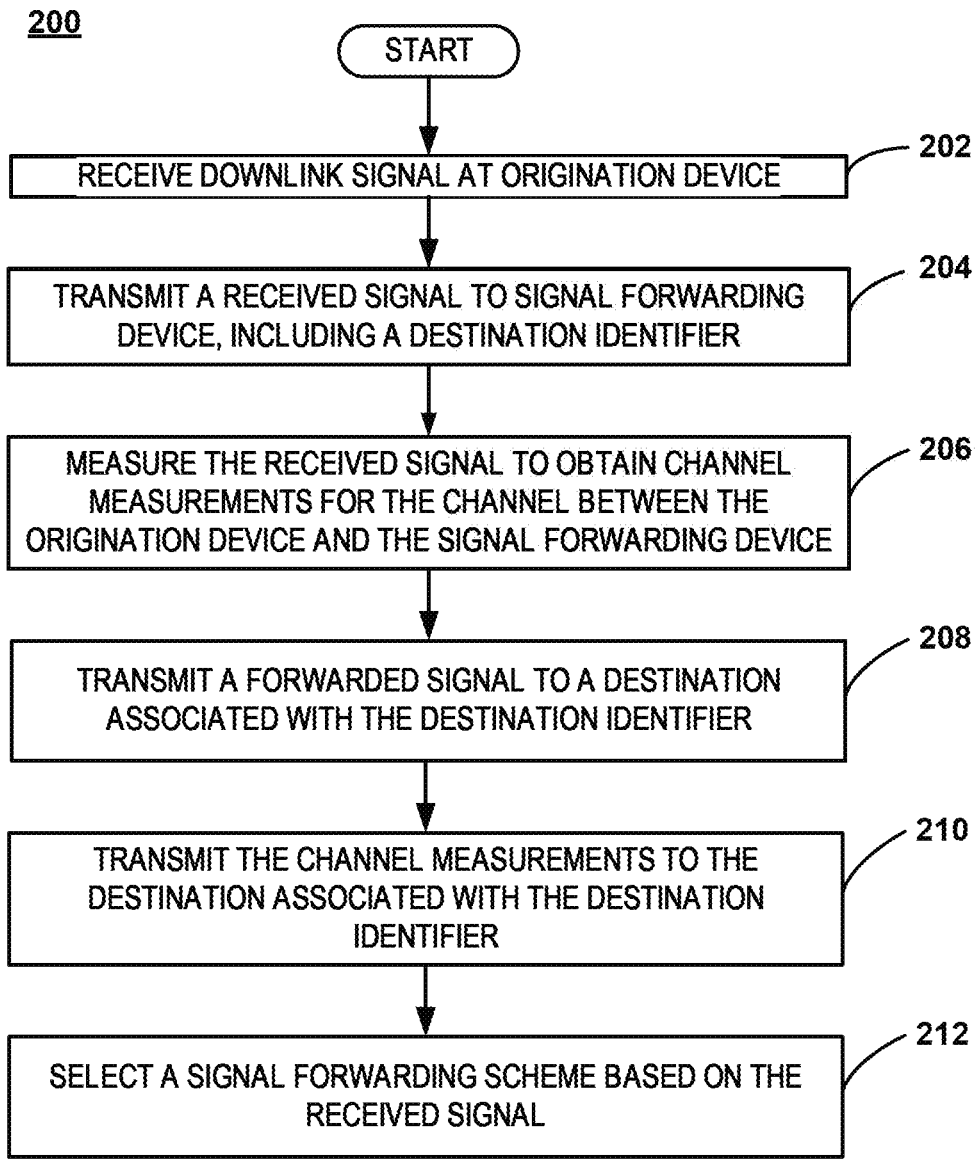
FIG. 2 is a flowchart of an example of a method of utilizing the wireless communication system of FIG. 1 to provide feedback to a destination device via a signal forwarding device.

FIG. 2 is a flowchart of an example of a method of utilizing the wireless communication system of FIG. 1 to provide feedback via a signal forwarding device. More specifically, the method of FIG. 2 describes how to provide downlink signal feedback to destination device 114 (e.g., an anchor base station) via a signal forwarding device. The method begins, at step 202, with receiving a downlink signal at origination device 110. For the example of FIG. 2, the downlink signal 112 is received from the destination device 114. However, in other examples, the downlink signal can be received from a base station other than destination device 114. Moreover, the origination device 110 may receive multiple downlink signals from multiple devices, which may or may not include destination device 114, and the subsequent uplink signal (e.g., received signal 136) sent to the signal forwarding device 138 may include feedback regarding any one or more of the received downlink signals.

In response to receiving the downlink signal, the origination device 110 transmits, at step 204, an uplink signal (e.g., received signal 136) to the signal forwarding device 138. The received signal 136 comprises a destination identifier that identifies an intended destination for the contents of the received signal 136. In the example of FIG. 2, the destination identifier identifies the destination device 114.

However, the destination identifier may be used to identify any suitable destination for the contents of the received signal 136. For example, the origination device 110 may be configured to include a destination identifier associated with a destination within the system 100 where a scheduler is located so that the scheduler can utilize the feedback data, as well as any other relevant information contained in the received signal 136 or that may be ascertained from the received signal 136, to schedule communication resources. Likewise, a destination may be chosen so that an appropriate entity (e.g., an anchor base station) can utilize the contents of the received signal 136 or any pertinent information that may be ascertained from the received signal 136 to select a signal forwarding scheme.

As discussed above, the received signal 136 may also comprise a downlink channel feedback report comprising downlink channel measurements for any one or more of the received downlink signals. In the example shown in FIG. 2, the downlink channel feedback report comprises downlink channel measurements for downlink signal 112. The downlink channel feedback report of FIG. 2 also identifies at least one of: a carrier on which the downlink channel measurements were made, and a cell identifier associated with a destination device that transmitted the downlink signal. Alternatively, the cell identifier may be associated with a base station, other than the destination device 114, that transmitted the downlink signal to which the downlink channel feedback report pertains.

In some examples, the received signal 136 may comprise an acknowledgment (ACK) response, which can be either a positive acknowledgment response (ACK) or a negative acknowledgment response (NACK), as discussed above. In the case of these examples, the received signal 136 may also identify at least one of: a carrier on which the downlink signal was received, and a cell identifier associated with a destination device 114 that transmitted the downlink signal 112. Alternatively, the cell identifier may be associated with a base station, other than the destination device 114, that transmitted the downlink signal to which the ACK response pertains.

At step 206, the signal forwarding device 138 measures the received signal 136 to obtain channel measurements associated with an origination device-to-signal forwarding device (OD-SFD) channel between the origination device 110 and the signal forwarding device 138.

At step 208, the signal forwarding device 138 transmits a forwarded signal 148 to a destination associated with the destination identifier contained in the received signal 136. As stated above, for the example shown in FIG. 2, the destination device 114 is the destination associated with the destination identifier. By sending an uplink signal (e.g., forwarded signal 148) to the destination device 114 that contains the contents of the received signal 136, the destination device 114 is able to indirectly receive the downlink channel feedback report and/or ACK response from the origination device 110, as well as any other useful information contained in, or ascertained from, the received signal 136. For example, the signal forwarding device 138 may additionally transmit, at step 210, the OD-SFD channel measurements, discussed above, to the destination device 114 as part of the forwarded signal 148. Alternatively, the signal forwarding device 138 may transmit the OD-SFD channel measurements in one or more other uplink signals to the destination associated with the destination identifier.

At step 212, a signal forwarding scheme is selected, based at least partially upon the forwarded signal 148. The signal forwarding scheme could be selected from any of the following: an amplify and forward (AF) signal forwarding scheme, a decode and forward (DF) signal forwarding scheme, a partial decode and forward (PDF) signal forwarding scheme, and a direct origination device-to-destination device signal forwarding scheme, in which the uplink signal is transmitted directly from the origination device to the destination device without any involvement by the signal forwarding device. In the example of FIG. 2, the controller 128 of the destination device 114 is configured to select, based at least partially upon the OD-SFD channel measurements, a signal forwarding scheme. In other examples, another entity besides the destination device 114 may be configured to select the signal forwarding scheme.

The selection of the signal forwarding scheme may depend, for example, on any of the following: the channel quality of the communication link between the destination device 114 and the origination device 110 (e.g., downlink channel feedback report), the channel quality of a communication link between a base station other than the destination device 114 and the origination device 110 (e.g., downlink channel feedback report), the channel quality of the communication link between the destination device 114 and the signal forwarding device 138 (e.g., which can be obtained by measuring the forwarded signal 148), and the channel quality of the communication link between the origination device 110 and the signal forwarding device 138 (e.g., the OD-SFD channel measurements).

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, at an origination device, a downlink signal;
   in response to receiving the downlink signal, transmitting, from the origination device, a first uplink signal to a signal forwarding device, the first uplink signal comprising a destination identifier and a downlink channel feedback report comprising downlink channel measurements of the downlink signal; and
   transmitting a forwarded signal, from the signal forwarding device, to a destination associated with the destination identifier, the forwarded signal being a second uplink signal based on the first uplink signal.

2. The method of claim 1, wherein the downlink channel feedback report identifies at least one of: a carrier on which the downlink channel measurements were made, a cell identifier associated with a destination device that transmitted the downlink signal, and a spatial vector associated with a beamformed downlink signal.

3. The method of claim 1, further comprising:
   measuring, by the signal forwarding device, the first uplink signal to obtain channel measurements associated with an origination device-to-signal forwarding device (OD-SFD) channel between the origination device and the signal forwarding device.

4. The method of claim 3, further comprising:
   transmitting the OD-SFD channel measurements to the destination associated with the destination identifier.

5. The method of claim 1, wherein the first uplink signal further comprises an acknowledgment (ACK) response.

6. The method of claim 5, wherein the first uplink signal identifies at least one of: a carrier on which the downlink signal was received, a cell identifier associated with a destination device that transmitted the downlink signal, and a spatial vector associated with a beamformed downlink signal.

7. The method of claim 1, further comprising:
   selecting, based at least partially upon the forwarded signal, a signal forwarding scheme.

8. The method of claim 7, wherein the signal forwarding scheme is selected from at least one of: an amplify and forward (AF) signal forwarding scheme, a decode and forward (DF) signal forwarding scheme, a partial decode and forward (PDF) signal forwarding scheme, a direct origination device-to-destination device signal forwarding scheme, and a control channel decode and forward/data channel forward without decoding scheme.

9. The method of claim 1, wherein downlink channel measurements are performed by the origination device by measuring the downlink signal.

10. The method of claim 1, wherein the downlink signal is transmitted from the destination, the destination being a base station.

11. A signal forwarding device comprising:
   a receiver configured to receive a first uplink signal from an origination device, the first uplink signal transmitted from the origination device in response to receiving a downlink signal, the first uplink signal comprising a destination identifier and a downlink channel feedback report comprising downlink channel measurements of the downlink signal; and a transmitter configured to transmit a forwarded signal to a destination associated with the destination identifier, the forwarded signal being a second uplink signal based on the first uplink signal.

12. The signal forwarding device of claim 11, wherein the downlink channel feedback report identifies at least one of: a carrier on which the downlink channel measurements were made, a cell identifier associated with a destination device that transmitted the downlink signal, and a spatial vector associated with a beamformed downlink signal.

13. The signal forwarding device of claim 11, further comprising:
a controller configured to measure the first uplink signal to obtain channel measurements associated with an origination device-to-signal forwarding device (OD-SFD) channel between the origination device and the signal forwarding device.

14. The signal forwarding device of claim 13, wherein the transmitter is further configured to transmit the OD-SFD channel measurements to the destination associated with the destination identifier.

15. The signal forwarding device of claim 11, wherein the first uplink signal further comprises an acknowledgment (ACK) response.

16. The signal forwarding device of claim 15, wherein the first uplink signal identifies at least one of: a carrier on which the downlink signal was received, a cell identifier associated with a destination device that transmitted the downlink signal, and a spatial vector associated with a beamformed downlink signal.

17. The signal forwarding device of claim 11, wherein downlink channel measurements are performed by the origination device by measuring the downlink signal.

18. The signal forwarding device of claim 11, wherein the downlink signal is transmitted from the destination, the destination being a base station.

19. A communication system comprising:
a destination device comprising a transmitter configured to transmit a downlink signal;
an origination device comprising:
a receiver configured to receive the downlink signal, and
a transmitter configured to transmit, in response to receiving the downlink signal, a first uplink signal, the first uplink signal comprising a destination identifier and a downlink channel feedback report comprising downlink channel measurements of the downlink signal; and a signal forwarding device comprising:
a receiver configured to receive the first uplink signal, and
a transmitter configured to transmit a forwarded signal to a destination associated with the destination identifier, the forwarded signal being a second uplink signal based on the first uplink signal.

20. The communication system of claim 19, wherein the signal forwarding device further comprises a controller configured to measure the first uplink signal to obtain channel measurements associated with an origination device-to-signal forwarding device (OD-SFD) channel between the origination device and the signal forwarding device.

21. The communication system of claim 20, wherein the transmitter of the signal forwarding device is further configured to transmit the OD-SFD channel measurements to the destination associated with the destination identifier, wherein the destination is the destination device.

22. The communication system of claim 21, wherein the destination device further comprises a controller configured to select, based at least partially upon the OD-SFD channel measurements, a signal forwarding scheme.

23. The communication system of claim 19, wherein downlink channel measurements are performed by the origination device by measuring the downlink signal.

24. The communication system of claim 19, wherein the downlink signal is transmitted from the destination, the destination being a base station.

* * * * *